United States Patent [19]

Hodel

[11] 4,393,531
[45] Jul. 19, 1983

[54] LINER FOR A WATER BED

[76] Inventor: Eugenio D. Hodel, 71 Upper Toyon, Kentfield, Calif. 94904

[21] Appl. No.: 209,388

[22] Filed: Nov. 24, 1980

[51] Int. Cl.³ .................. A47C 27/08; B65D 5/36
[52] U.S. Cl. ............................................. 5/451; 4/580; 4/585; 220/403; 150/49
[58] Field of Search .............. 5/451, 452, 422; 150/49, 48; 220/403, 404; 4/580, 585, 586, 587; 229/41 R

[56] References Cited

U.S. PATENT DOCUMENTS

| | | | |
|---|---|---|---|
| 2,839,762 | 6/1958 | Momura | 150/49 |
| 2,878,488 | 3/1959 | Doskocil | 4/580 |
| 2,950,484 | 8/1960 | Jaffe | 150/49 |
| 3,735,432 | 5/1973 | Kreten et al. | 5/451 |
| 3,856,064 | 12/1974 | Swallert | 150/49 |
| 4,062,077 | 12/1977 | Antrey et al. | 5/451 |
| 4,245,364 | 1/1981 | Callbance | 5/451 |

FOREIGN PATENT DOCUMENTS 18789 of 1898 United Kingdom .................. 4/585

Primary Examiner—Alexander Grosz
Attorney, Agent, or Firm—Mark C. Jacobs

[57] ABSTRACT

A liner for a water bed wherein the liner includes a flat planar flexible panel forming the bottom and integral upright sides covered with a flexible material, the material forming the bottom and sides presenting a water tight enclosure, the sides being reinforced by rigid panel members, the entire liner being self supporting in a first position forming a liner for enclosing the mattress of a water bed therein and foldable to a second folded position for transport or storage.

5 Claims, 4 Drawing Figures

LINER FOR A WATER BED

BACKGROUND OF THE INVENTION

1. Field of the Invention

The invention relates to water bed mattress liners; and, more particularly, to a tackless liner for the mattress of a water bed which is installed without the need for securing the same to the bed frame.

2. Description of the Prior Art

It is well known that a water bed mattress holds a considerable amount of water and has been known to leak or rupture in the past. In order to contain water that might leak or escape from the mattress, most water beds have a liner which is of generally water tight material, such as vinyl, and is installed in the frame of the bed prior to placement of the mattress therein. The mattress thus sits on and inside of the liner which will hold any water leaking or escaping from the mattress.

Many variations of liners have been suggested in the past. In one prior art arrangement, a vinyl flexible liner in the form of a rectangular sheet having upright sides is placed inside of the bed frame and the upright sides are nailed to the inside of the upright sides of the bed frame by nails passing through rigid strips of material thus securing the liner to the frame. Needless to say, such nails or any similar fastening means can work loose and make holds in the mattress causing damage thereto.

In another prior art arrangement, elongated strips of a rigid material are secured along the inside walls of the upright sides of the bed frame so that their upper surfaces are unrestricted. A flexible liner is then laid inside of the frame and the ends thereof are inserted over the unrestricted sides of the strips thereby trapping the liner between the strips and the frame. Such an arrangement requires hardware securing the strips to the frame, such as nails or screws, which can work loose and puncture the mattress. Further, the strips must be secured to the frame in a way such that they resiliently grasp or trap the liner so it won't shift or move out of engagement with the strips during use.

Both prior art arrangements discussed above obviously require elaborate installation and cannot easily be taken down if one desires to drain and move the water bed.

There is thus a need for a water bed liner which is easy to install, can be taken down quickly and easily, requires no nails, screws, tacks or hammering or other securing means and provides a perfect fit for the mattress.

SUMMARY OF THE INVENTION

It is an object of this invention to provide a liner for a water bed which can be quickly and easily folded for storage or unfolded for use.

It is a further object of this invention to provide a liner which can be folded up and removed from the water bed frame when it is desired to move the same.

It is still another object of this invention to provide a liner which is substantially self supporting when in a position in the water bed frame to receive the mattress therein.

It is another object of this invention to carry out the foregoing objects without nails, tacks, screws or other securing means that might puncture the mattress of the water bed.

These and other objects of the invention are preferably accomplished by providing a liner which includes a flat planar flexible panel forming the bottom and integral upright sides covered with a flexible material, the material forming the bottom and sides presenting a water tight enclosure, the sides being reinforced by rigid panel members, the entire liner being self supporting in a first position forming a liner for enclosing the mattress of a water bed therein and foldable to a second position for transport or storage.

DESCRIPTION OF THE PREFERRED EMBODIMENT

Figure 1:
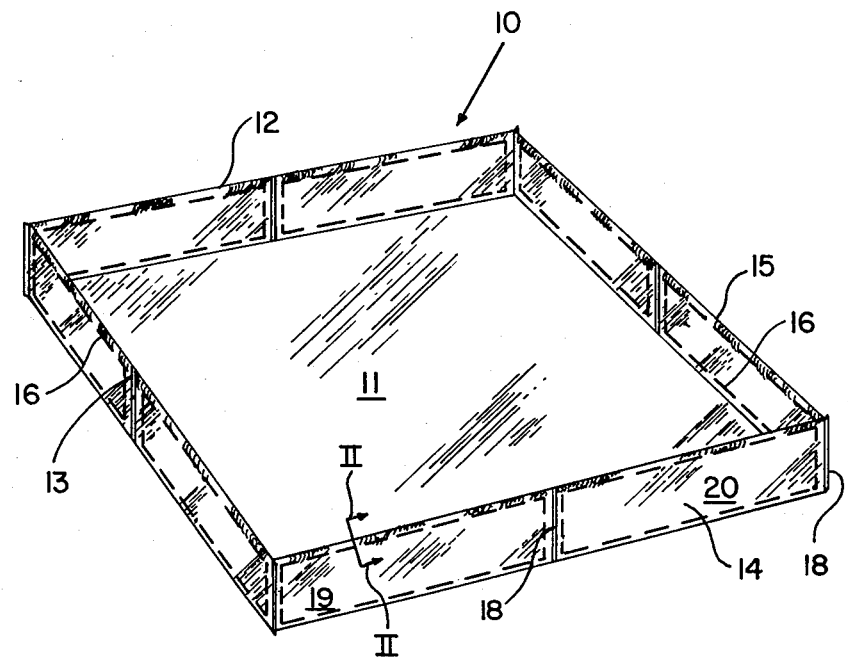
FIG. 1 is a perspective view of a liner in open position in accordance with the teachings of the invention.

Referring now to FIG. 1 of the drawing, a liner 10 adapted to be mounted in the frame of a water bed for enclosing a mattress therein is shown in the fully open position and may obviously be of any suitable configuration, square shaped, elongated rectangular, round, etc., depending on the shape of the water bed. As shown in FIG. 1, liner 10 is adapted to be merely inserted inside of the frame of a convential water bed with the mattress thereof resting on top of bottom panel 11. Liner 10 has four upstanding sides 12 through 15, each side being compressed of two separate panel sections as will be discussed.

Figure 2:
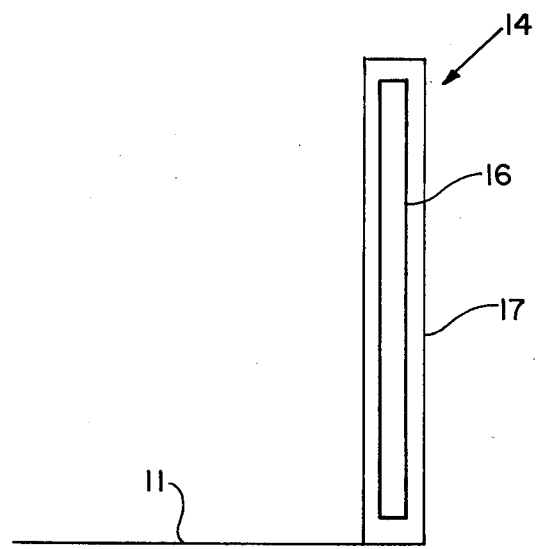
FIG. 2 is a view taken along lines II—II of FIG. 1.

As shown in FIG. 2, each side 12 through 15 is reinforced by a rigid panel member 16 covered by vinyl material 17. Material 17 is integral with bottom wall 11. In other words, the entire liner 10 may be one sheet of vinyl material 17 which covers rigid panel members 16 to form upright sides 12 through 15. Bottom wall or panel 11 is of course not reinforced.

As indicated at seam 18 in FIG. 1, each side 12 through 15 is comprised of two panel members 16 separated at seam 18. In other words, bottom panel 11 may be a single sheet of a flexible vinyl material secured or sealed in any suitable manner to vinyl material 17 enveloping panel members 16 forming upright sides 12 through 15, the doubled vinyl material 17 being sealed or separated at seam 18 forming two separate side sections for each side 12 through 15 (e.g., side sections 19,20 in FIG. 1).

Since sides 12 through 15 in the FIG. 1 position are self supporting, the entire liner 10 can be placed inside of a water bed frame, and a heater, if desired, placed on top of bottom panel 11, and a mattress (not shown) on top of the heater and panel 11.

The liner 10 thus provides a perfect fit to the mattress and does not require any nailing or securing to the water bed frame and sides 12 through 15 merely abut against the inside of the water bed frame side walls.

Figure 3:
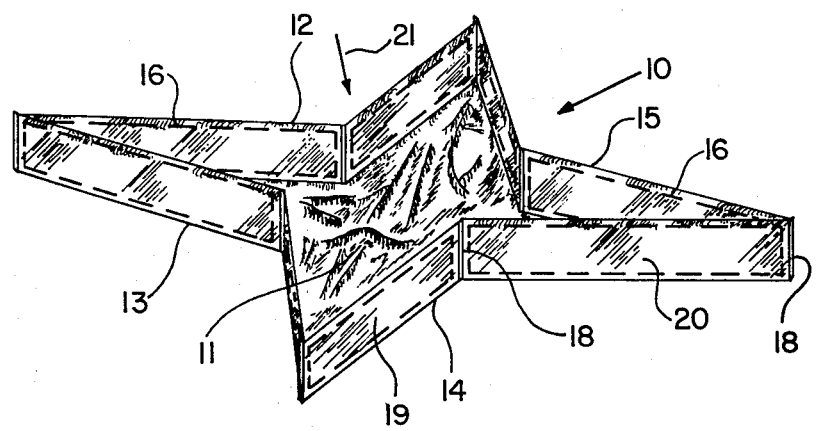
FIG. 3 is a view of the liner of FIG. 1 in perspective illustrating movement of the sides inwardly for folding the same in accordance with the teachings of the invention.

When it is desired to remove the liner 10 from the water bed frame, as shown in FIG. 3, each side 12 through 15 is pushed in the direction of arrow 21 thus moving the intersection (at seam 18) of each side 12 through 15 inwardly to the star-like position shown in FIG. 3. Since the bottom panel 11 is not reinforced, the entire liner collapses with each section 19,20 of each side 12 through 15 folding about seam 18 to an abutting position permitting the entire liner 10 to be folded to the FIG. 4 position. Of course, the entire process is reversed to unfold the liner 10 from the FIG. 4 to the FIG. 3 and, ultimately, to the FIG. 1 position, the side sections 18,19 being pulled in a direction opposite that of arrow 21 to open the liner 10.

Figure 4:
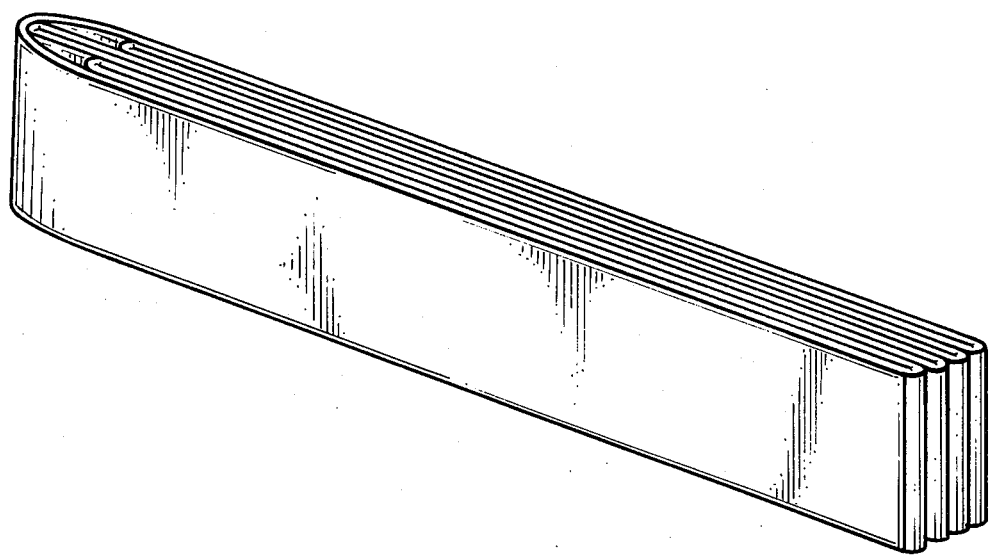
FIG. 4 is a perspective view of the liner of FIGS. 1 through 3 in the final folded position.

It can be seen that liner 10 is easy to install and can be taken down quickly and easily, folded up to the FIG. 4 position, and stored until needed. No tools or nails or other securing means are required. The liner 10 may be unfolded to the FIG. 1 position and installed in a perfect fit each time resulting in less man hours for installation and ease of assembly to the purchaser. The entire liner 10 may be made from any suitable water tight flexible material, such as vinyl, reinforced (panel members 16) by suitable rigid materials in each side 12 through 15. The sections of vinyl material 17 forming sides 12 through 15 and bottom panel 11 may be one integral piece or otherwise formed of separate sections secured together by known means, such as heat sealing or electronic or sonic welding. The vinyl material may be of any suitable thickness, preferably a double wall construction, thereby providing a water tight liner.

The materials used in panel members 16 may be any suitable rigid material, such as cardboard, polyvinyl sheeting, Masonite©, a brand of pressed board, plywood, etc. The panel members 16 may be of any suitable dimensions, e.g. ⅛th of an inch in thickness, the length and width generally related to the length and width of the water bed frame. The various sections making up the vinyl material of frame 10 may be secured together in any suitable manner, e.g., butt seams, overlap seams, etc. In fact, the vinyl sheets may be shipped without panels 16 installed with the members subsequently inserted into the vinyl material 17 (FIG. 2) via slits or pockets formed therein, the open pockets then being sealed in any suitable manner.

It can be seen from the foregoing that there is described a water tight liner for a water bed that is self supporting in use, can be quickly and easily folded for transport or storage, and requires no tacks, nails, or tools for installing the same.

I claim:

1. In a waterbed which comprises a liquid containing mattress disposed in a frame, the improvement comprising a liner for a waterbed, the liner being adapted to be installed in the frame prior to installing the mattress therein, the liner comprising:

a planar bottom panel of a flexible water tight material;

a plurality of upstanding side walls secured to the periphery of said bottom panel thereby forming a container for containing therein a mattress, said side walls being adapted to encircle said mattress; and each of said upstanding side walls having two equal sections, defined by rigid panels completely enclosed by a waterproof sheet, the two equal sections of each of said side walls being separated by a seam that permits folding of the structure, said water-tight material of all of said side walls being secured to said bottom panel in a fluid tight manner.

2. A liner adapted to be interposed between a waterbed mattress and a frame for said mattress, said liner comprising a first sheet of planar rectangular water-tight material that is flexible, four elongated side panels secured one per each side of said first sheet extending in a direction generally normal to the plane of said first sheet, the shorter sides of said side panels abutting against and secured to adjacent side panels: one of the elongated sides of all of said side panels and said first sheet being secured each other in a water-tight relationship, and each of said side panels being comprised of a flexible water tight material totally enclosing a pair of equals, elongated rigid panel members lying in generally the same parallel plane and extending along the longer side of each of said side panels and separated from each other by a seam sealing off one of said panel members from the other, thereby forming a liner having a flexible water-tight bottom panel and upright rigid side panels covered by a flexible material.

3. A liner adapted to be interposed between a waterbed mattress and a frame for said mattress which comprises:

a rectangular structure having a planar bottom panel of a flexible water tight material, and four upstanding side walls, each upstanding side wall secured to the periphery of said bottom panel thereby forming a container for holding a waterbed mattress therein, each of said upstanding side walls having two equal sections, defined by rigid rectangular panels completely enclosed by a waterproof sheet, the two equal sections of each of said side walls being separated by a seam that permits folding of the structure.

4. In the liner of claim 3 wherein said flexible water-tight material is vinyl.

5. In the liner of claim 3 wherein said rigid material is pressed board.

* * * * *